US012807205B2

(12) United States Patent
Hayward et al.

(10) Patent No.: US 12,807,205 B2
(45) Date of Patent: Nov. 24, 2026

(54) TROLLEY

(71) Applicant: Armorgard Holdings Limited, Fareham (GB)

(72) Inventors: Tom Hayward, Fareham (GB); Matthew Partridge, Hampshire (GB)

(73) Assignee: ARMORGARD HOLDINGS LIMITED, Fareham (GB)

( * ) Notice: Subject to any disclaimer, the term of this patent is extended or adjusted under 35 U.S.C. 154(b) by 184 days.

(21) Appl. No.: 18/590,627

(22) Filed: Feb. 28, 2024

(65) Prior Publication Data

US 2024/0199106 A1 Jun. 20, 2024

Related U.S. Application Data

(63) Continuation of application No. PCT/GB2022/052425, filed on Sep. 23, 2022.

(30) Foreign Application Priority Data

Sep. 24, 2021 (GB) ..................................... 2113663

(51) Int. Cl.
*B62B 5/04* (2006.01)
*B62B 3/02* (2006.01)
(Continued)

(52) U.S. Cl.
CPC .............. *B62B 5/0414* (2013.01); *B62B 3/02* (2013.01); *B62B 3/108* (2013.01); *B62B 5/04* (2013.01);
(Continued)

(58) Field of Classification Search
CPC ......... B62B 5/0414; B62B 3/02; B62B 3/108; B62B 5/04; B62B 5/0447; B62B 5/0485; B62B 5/061; B62B 5/067
See application file for complete search history.

(56) References Cited

U.S. PATENT DOCUMENTS 3,923,167 A * 12/1975 Blankenbeckler ....... B25H 1/00
414/743
4,417,648 A 11/1983 Anderson et al.
(Continued)

FOREIGN PATENT DOCUMENTS

DE 202004010097 12/2004
EP 3835172 6/2021
(Continued)

OTHER PUBLICATIONS

International Search Report and Written Opinion of the International Searching Authority for PCT/GB2022/052425, Dec. 20, 2022, 11 pages.
(Continued)

*Primary Examiner* — Jacob B Meyer
(74) *Attorney, Agent, or Firm* — Heslin Rothenberg Farley & Mesiti P.C.

(57) ABSTRACT

A load bearing manual handling trolley apparatus having a frame comprising a base, the base comprising a front face, a rear face and two connecting faces arranged to form a supportive base with four corners. The trolley apparatus further includes a pivotable member connected to the frame, at least one wheel located at each corner of the base, a brake mechanism and a wheel brake apparatus, at least one handle member, an elongate member that connects the at least one handle members to the brake mechanism, and arranged in operative communication with the wheel brake apparatus and arranged to actuate the wheel brake apparatus such that actuation of any one of the at least one handle members decouples the brake mechanism. The elongate member is arranged to rotate and actuation of the at least one handle member rotates the elongate member. The elongate member is biased to the braked configuration.

19 Claims, 6 Drawing Sheets

(51) Int. Cl.
*B62B 3/10* (2006.01)
*B62B 5/06* (2006.01)

(52) U.S. Cl.
CPC .......... *B62B 5/0447* (2013.01); *B62B 5/0485* (2013.01); *B62B 5/061* (2013.01); *B62B 5/067* (2013.01)

(56) References Cited

U.S. PATENT DOCUMENTS

| | | | | |
|---|---|---|---|---|
| 6,032,966 | A * | 3/2000 | Young | B62B 3/108 414/11 |
| 6,409,187 | B1 * | 6/2002 | Crow, Jr. | B62B 5/04 188/29 |
| 6,786,503 | B1 * | 9/2004 | Young | B62B 3/008 280/35 |
| 7,048,258 | B1 * | 5/2006 | Dromgool | E04F 21/1822 254/332 |
| 7,628,408 | B2 * | 12/2009 | Kolesa | B62B 3/08 280/654 |
| 8,104,787 | B2 * | 1/2012 | Haley | B62B 3/108 108/115 |
| 8,353,524 | B2 * | 1/2013 | Gonzalez | B62B 3/02 280/654 |
| 8,366,084 | B2 * | 2/2013 | Halladay | B25H 1/04 269/17 |
| 9,004,509 | B2 * | 4/2015 | Smith | B62B 3/108 280/651 |
| 9,579,241 | B2 * | 2/2017 | Spoor | B60B 33/0092 |
| 9,944,121 | B2 * | 4/2018 | Wang | B62B 3/001 |
| 10,017,199 | B2 * | 7/2018 | Silva | B62B 3/02 |
| 2003/0127834 | A1 * | 7/2003 | Click | B62B 3/108 280/651 |
| 2024/0199106 | A1 * | 6/2024 | Hayward | B62B 5/04 |
| 2024/0199107 | A1 * | 6/2024 | Hayward | B62B 5/0414 |

FOREIGN PATENT DOCUMENTS

| | | |
|---|---|---|
| GB | 2002301 | 2/1979 |
| GB | 2576394 | 2/2020 |

OTHER PUBLICATIONS

Examination Report from UK Intellectual Property Office for GB2113663.5 dated Feb. 5, 2025, 2 pages.
Search Report from Intellectual Property Office for GB2113663.5 dated Mar. 23, 2022, 2 pages.

* cited by examiner

TROLLEY

CROSS REFERENCE TO RELATED APPLICATIONS

This continuation application claims priority benefit from International Application No. PCT/GB2022/052425 filed on Sep. 23, 2022, which claimed priority from Great Britain Application No. 2113663.5 filed on Sep. 24, 2021, both of which are incorporated herein by reference in their entireties.

FIELD OF THE INVENTION

The present invention relates to a load bearing manual handling trolley apparatus.

BACKGROUND TO THE INVENTION

Manual handling aides such as trolleys, wheeled units, carts and mobile storage racks are used in many industries to transport and store materials and goods which may be too large, too heavy, dangerous or awkward to be transported by hand.

Safe, fast and secure braking is paramount to prevent damage or injury to the operator, transported goods and surrounding environment, especially given the often heavy, precious or fragile nature of the loads carried.

Known aids often provide foot operated brakes located at each wheel or castor. These brakes are awkward to reach due to their location underneath the trolley and it is cumbersome for the operator to manually access and engage/disengage each brake individually. Further, it is likely unobvious to the operator if each brake is engaged or disengaged when approaching the aide. In this way, safety may be compromised, for example, if the aide is stationary and the operator believes the brakes are engaged when they are not. Some known aids provide multiple-handle braking; such that two or more operators are required to halt or prevent motion the trolley. As such, braking of the trolley by a single operator from a single point is not possible and safety is compromised.

It is advantageous to provide a manual handling apparatus that also functions as a workbench, as it improves ease of loading goods onto the apparatus and further allows a user to action the loaded goods in situ. Additionally, when transporting large goods such as pipework and boards, it can be challenging to fit the manual handling apparatus with the loaded goods through narrow spaces, such as corridors and doorways.

There is therefore a need for improved manual handling aides which provide a safer, easier and more accessible way to transport goods and to halt or prevent motion of the aide.

Objects and aspects of the present claimed invention seek to alleviate at least these problems with the prior art.

SUMMARY OF THE INVENTION

According to a first aspect of the invention, there is provided a load bearing manual handling trolley apparatus, the trolley apparatus comprising: a frame comprising a base, the base comprising a front face, a rear face and two connecting faces arranged so as to form a supportive base with four corners; the trolley apparatus further comprising a pivotable member pivotably connected to the frame, the pivotable member configured to pivot between a first position and a second position; at least one wheel located at each corner portion of the base; a brake mechanism comprising a wheel unit and a wheel brake apparatus for engaging the wheel unit, the wheel unit comprising at least one wheel; at least one handle member located on the frame; an elongate member, the elongate member connecting each of the at least one handle members to the brake mechanism, and arranged in operative communication with the wheel brake apparatus and arranged to actuate the wheel brake apparatus such that actuation of any one of the at least one handle members decouples the brake mechanism; wherein the elongate member is arranged to rotate about its longitudinal axis and actuation of the at least one handle member rotates the elongate member about its longitudinal axis; wherein the elongate member is biased to the braked configuration.

In this way, a trolley apparatus with a safer, easier and more accessible braking system is provided. The trolley apparatus allows safe and efficient storage and transportation of various length and sizes of boards, panels, ductwork, pipe and other materials. The pivotable member can be pivoted to reduce the footprint of the trolley apparatus, allowing the trolley apparatus and its load to fit through narrower spaces such as corridors and doorways. The user can load the pivotable member with goods, such as boards, sheets and/or pipework, such that the pivotable member accommodates the goods and supports the load during transportation.

The apparatus of the invention reduces risk of injury to persons and damage to goods transported and stored on the apparatus. Additionally, the number of persons required to move the trolley apparatus is not limited to a minimum number, as a single person is able to safely manoeuvre and park the apparatus. Further, persons are not able to override the brake system, improving safety. The brake mechanism can be used as a full stop of a brake with full release, or, as it is a friction dead-man brake and not a slotted disc-brake, the brake can also be used to slow and control the trolley. In this way, the trolley apparatus can undergo a gradual stopping motion rather than abrupt 'peg in slot' stopping. As such, a 'dead man' braking system is provided.

Preferably, a portion of the at least one handle member projects beyond the length of the pivotable member. In this way, the user can easily access the at least one handle member when goods are loaded onto the pivotable member, in use. Preferably, the at least one handle member is telescopic in a direction away from the frame. In this way, the handle member can be telescopically extended outwards from the frame and retracted back to the non-telescopic position.

For example, a board of length greater than the length of the trolley apparatus can be loaded onto the trolley apparatus and the at least one handle member can be extended such that a portion of the at least one handle member extends beyond the length of the board. In this way, the user can actuate the at least one handle member from a location distal any load on the trolley apparatus, improving the safety to the user. Further, the user can easily reach the handle member without unduly limiting the length of the load that can be applied to the trolley apparatus or risking the safety of the user.

Preferably, the at least one handle member is located at an end of the elongate member. Preferably, the at least one handle member is rotably coupled to the elongate member. In this way, direct rotation of the at least one handle member about its longitudinal axis is translated into direct rotation of the elongate member about its longitudinal axis.

Preferably, the elongate member extends along substantially the entire length of the frame. In this way, a handle member can be located at the two distal ends of the elongate member such that both handle members are coupled to the elongate member and one another.

Preferably, the pivotable member comprises at least one hand accommodation portion. In this way, a user can manually pivot the pivotable member via the at least one hand accommodation portion. Preferably, the at least one hand accommodation portion is located at the perimeter of the pivotable member. Preferably, the at least one hand accommodation portion comprises one hand accommodation portion located centrally along a face of the pivotable member.

Preferably, the at least one hand accommodation portion is telescopic. Preferably, the at least one hand accommodation portion is configured to be removably retained at a plurality of telescopically extended positions. Preferably, the at least one hand accommodation portion comprises a locking member configured to lock the at least one hand accommodation portion in each of the plurality of telescopically extended positions. In this way, the at least one hand accommodation portion can be locked at a number of different telescopic extensions, depending on the size of the load, the leverage force required by the user and/or the ergonomics of the user including the required height and strength capability. Preferably, the at least one hand accommodation portion comprises a non-telescopic position wherein substantially no portion of the at least one hand accommodation portion extends beyond the perimeter of the pivotable member. In this way, the footprint of the trolley apparatus can be reduced.

Preferably, the pivotable member comprises a counterbalance unit configured to prevent rotation of the pivotable member unless a force is applied to the at least one hand accommodation portion. In this way, when a load is removed from the pivotable member, the pivotable member does not return to its natural position under gravity. For example, when the pivotable member is in the first position and a load is removed from the pivotable member, the pivotable member does not automatically pivot to the second position. Such a feature improves safety of the trolley apparatus and prevents 'trebuchet' motion of the pivotable member regardless of the load on the trolley apparatus. The pivotable member can be pivoted whilst unloaded or whilst loaded without a 'jerk' motion which would risk harm to the user. More preferably, the counterbalance unit comprises at least one pneumatic member, the pneumatic member connecting the frame to the pivotable member. For example, the pneumatic member may be a gas spring, gas strut or other suitable pneumatic damping mechanism. Further, the counterbalance may include at least one mechanical damping member, for example a spring. In addition, the counterbalance unit may include at least one hydraulic member. For example, the hydraulic member may comprise a hydraulic ram.

Preferably, the counterbalance unit comprises two pneumatic members located at opposing distal ends of the frame. Alternatively, the counterbalance unit comprises three pneumatic members with a first and second pneumatic member located at each end of two opposing sides of the pivotable member and a third pneumatic member located equidistant the first and second pneumatic member. In this way, the pneumatic members are located equidistant along the length of the pivotable member. In select embodiments, the counterbalance unit comprises one pneumatic member. In such embodiments, the pneumatic member is located equidistant from either end of the pivotable member.

Preferably, the at least one pneumatic member is connected at a first end to the frame and is connected at a second end to the pivotable member. More preferably, the at least one pneumatic member is connected at a first end of the upstanding portion. Preferably, the at least one pneumatic member is connected at a second end to the underside of the pivotable member. Namely, the underside of the pivotable member is the surface of the pivotable member facing the upstanding portion when the pivotable member is in the second position.

Preferably, the at least one pneumatic member comprises an adjustable member configured to adjust the location of the connection of the second end to the pivotable member. Advantageously, the adjustable member assists with the pivoting force of the pivotable member depending on which direction the pivotable member is pivoting in between the first and second position. Such a feature reduces the skew that would occur in the counterbalance assistance of the at least one pneumatic member. Preferably, the adjustable member is configured to adjust the connection of the second end to the pivotable member along a linear pathway. Preferably, each pneumatic member of the at least one pneumatic member comprises an adjustable member.

Preferably, the counterbalance unit comprises a locking unit configured to lock the pivotable member in the first position and/or the second position. Preferably, pivot motion of the pivotable member is independent of the brake mechanism. In this way, the brake mechanism can be actuated independent of the position of the pivotable member.

Preferably, the pivotable member is connected to the frame along the longitudinal axis of the frame. Preferably, the frame comprises an upstanding portion extending along a portion of its longitudinal axis and in a direction away from the base, the pivotable member connected to the upstanding portion. In this way, the pivotable member can be mounted at a height such that the pivotable motion of the pivotable member about the frame is not obstructed by the base of the frame.

Preferably, in the first position, the pivotable member is substantially parallel to the base. In this way, the pivotable member can be positioned substantially horizontally to the surface which the trolley apparatus is traversing. The first position allows a user to easily load and action goods, such as boards and panels, on the trolley apparatus such that the trolley apparatus doubles as a workbench and workstation. In select embodiments, the first position is equal to the second position. In this way, the pivotable member is not configured to pivot.

Preferably, in the second position, the pivotable member is substantially flat against the frame. More preferably, in the second position, the pivotable member is substantially flat against the upstanding portion, at an acute angle to the normal axis of the base of the frame. Preferably, the acute angle is between 0 and 30 degrees.

Preferably, the wheel brake apparatus comprises an at least one brake pad, the at least one brake pad arranged to engage with the at least one wheel of the wheel unit so as to urge the wheel into a stationary braked position. Preferably, the wheel brake apparatus comprises a friction brake. Alternatively, the wheel brake apparatus comprises a disc brake.

Preferably, the wheel brake apparatus is located at the perpendicular intersection of the longitudinal axis of the base. More preferably, the wheel unit is located proximate the centre of the base. In this way, the weight of the trolley apparatus and its load can be substantially evenly distributed about the wheel brake apparatus. Preferably, the wheel unit comprises two wheels. Preferably, the wheel unit comprises two wheels located at opposing sides of the base. In this way, the distribution of weight of the trolley is more evenly spread and the toppling moment of the trolley apparatus over the wheel unit is reduced. Further, two wheels at or close to the centre of mass of the base of the trolley improves maneuverability, in particular turning the trolley in a circle, over a single wheel in the same location.

Alternatively, the brake mechanism is located at each of the at least one wheel located at each corner portion of the base. In such embodiments, it is preferred that the wheel unit comprises two wheels located at opposing sides of the base at the perpendicular intersection of the longitudinal axis of the base. Namely, the wheel unit comprises two wheels located centrally on the long sides of the base.

Preferably, the wheels are selected from the range; fixed wheels, fixed castors, swivel castors and glides. It is envisaged that any suitable wheel type may be used, preferably wheels which provide little resistance to motion of the trolley apparatus, such that the trolley apparatus is easier to maneuver, and the wheels are fit for use on the terrain/s the trolley apparatus will be traversing. Most preferably, the wheels are swivel castors. Use of castors improves maneuverability of the trolley apparatus and the trolley apparatus is not limited to movement in a limited number of directions, such as a single direction. The trolley is able to be parked and consequently moved again in any direction, depending on the external environment and obstacles to motion of the trolley. The at least one wheel located at each corner of the base helps stabilise the load of the trolley apparatus.

Preferably, the brake mechanism comprises an elongate brake member coupled to each wheel of the wheel unit and wherein the elongate brake member is configured to rotate about its longitudinal axis. Preferably, the elongate brake member is a bar with hexagonal cross section. Preferably, the brake mechanism comprises a cable connected to the elongate member. In some embodiments, the cable comprises a plurality of cables. Alternatively, the wheel brake apparatus comprises at least one rod connected to the elongate member.

Preferably, the brake mechanism further comprises at least one cam configured to transfer linear motion of the cable to rotational motion via the elongate brake member. Preferably, the cable is coupled to the at least one cam. Preferably, the at least one cam comprises an arm in communication with the cable and the elongate brake member. In this way, the length of the arm can be extended to increase the leverage and moment force on the elongate brake member.

Preferably, the cable is non-extensible. Preferably, the tension in the cable is adjustable. In this way, there is provided an improved ease of set-up and maintenance. Preferably, the cable is under continuous tension. Alternatively, the cable is slack until a handle member is actuated. In this way, actuation of the handle member introduces tension in the cable.

Preferably, the brake mechanism comprises at least one resilient member operably coupled to the cable. More preferably, the resilient member biases the brake mechanism to a brake position. Preferably, the resilient member is connected to the elongate brake member via the cam. Preferably, each resilient member is also connected to a fixed portion of the brake mechanism. In alternative embodiments, the resilient member is instead connected to the base of the frame. Preferably, the cam provides at least one weld to connect the cam to the resilient member and/or the brake mechanism.

Preferably, the frame is hollow. In this way, the weight of the trolley apparatus can be reduced, improving ease of maneuverability. Alternatively, the frame may be a solid structure such that load bearing capacity of the trolley apparatus is increased. For example, the frame may be a box section frame or a sheet metal frame.

Preferably, the base of the frame is an open structure comprising a plurality of beams. In alternative embodiments, it is envisaged that the base is a solid or closed structure or formed in any appropriate way for transporting loads.

In some embodiments, the at least one handle member is substantially T-shaped. It is envisaged that the at least one handle member may be any suitable shape, in particular a shape to assist rotation of the at least one handle member about its longitudinal axis.

In some embodiments, one or more of the wheels comprise a manual brake. For example, one or more wheels may comprise a foot-operated brake. In this way, additional braking means is provided for safety.

Preferably, the trolley apparatus comprises at least one load retention portion configured to retain at least a portion of a load on the trolley apparatus. Preferably, the at least one load retention portion comprises a retaining member and a retaining member acceptance portion. For example, the load retention portion may comprise at least one strap, rope, elastic cord, clamp, tie, cut-out portion and/or clip. The retaining member may be, for example, a strap and the retaining member acceptance portion may be a cut out or lay located on the trolley apparatus for accepting and removably retaining the retaining member in the retaining member acceptance portion. The retaining member may be extensible or inextensible. The retaining member may be removably retainable on the trolley such that the type of retaining member can be selected based on the load of the trolley. Preferably, the at least one load retention portion is located on the pivot member. More preferably, the at least one load retention portion extends about at least two faces of the pivotable member. Preferably, a portion of the load retention member is located on the underside of the pivot member. For example, the retaining member acceptance portion may be located on the underside of the pivot member.

Preferably, the trolley apparatus comprises a carrying member configured to allow the trolley apparatus to be carried by a transportation apparatus. More preferably, the trolley apparatus comprises a forklift carrying member configured to allow the trolley apparatus to be carried by a forklift truck. Preferably, the forklift carrying member is located on the underside of the base.

It is envisaged that the trolley apparatus may be configured to carry a single type of load such as, for example, boards, sheets, panels or pipework. More preferably, the trolley apparatus is configured to carry a plurality of different loads. In this way, a versatile trolley apparatus is provided.

BRIEF DESCRIPTION OF THE DRAWINGS

The accompanying drawings, which are incorporated in and constitute a part of the specification, illustrate embodiments of the invention and together with the detailed description herein, serve to explain the principles of the invention. The drawings are only for purposes of illustrating preferred embodiments and are not to be construed as limiting the invention. It is emphasized that, in accordance with the standard practice in the industry, various features are not drawn to scale. In fact, the dimensions of the various features may be arbitrarily increased or reduced for clarity of discussion. The foregoing and other objects, features and advantages of the invention are apparent from the following detailed description taken in conjunction with the accompanying drawings in which.

DETAILED DESCRIPTION FOR CARRYING OUT THE INVENTION

Figure 1:
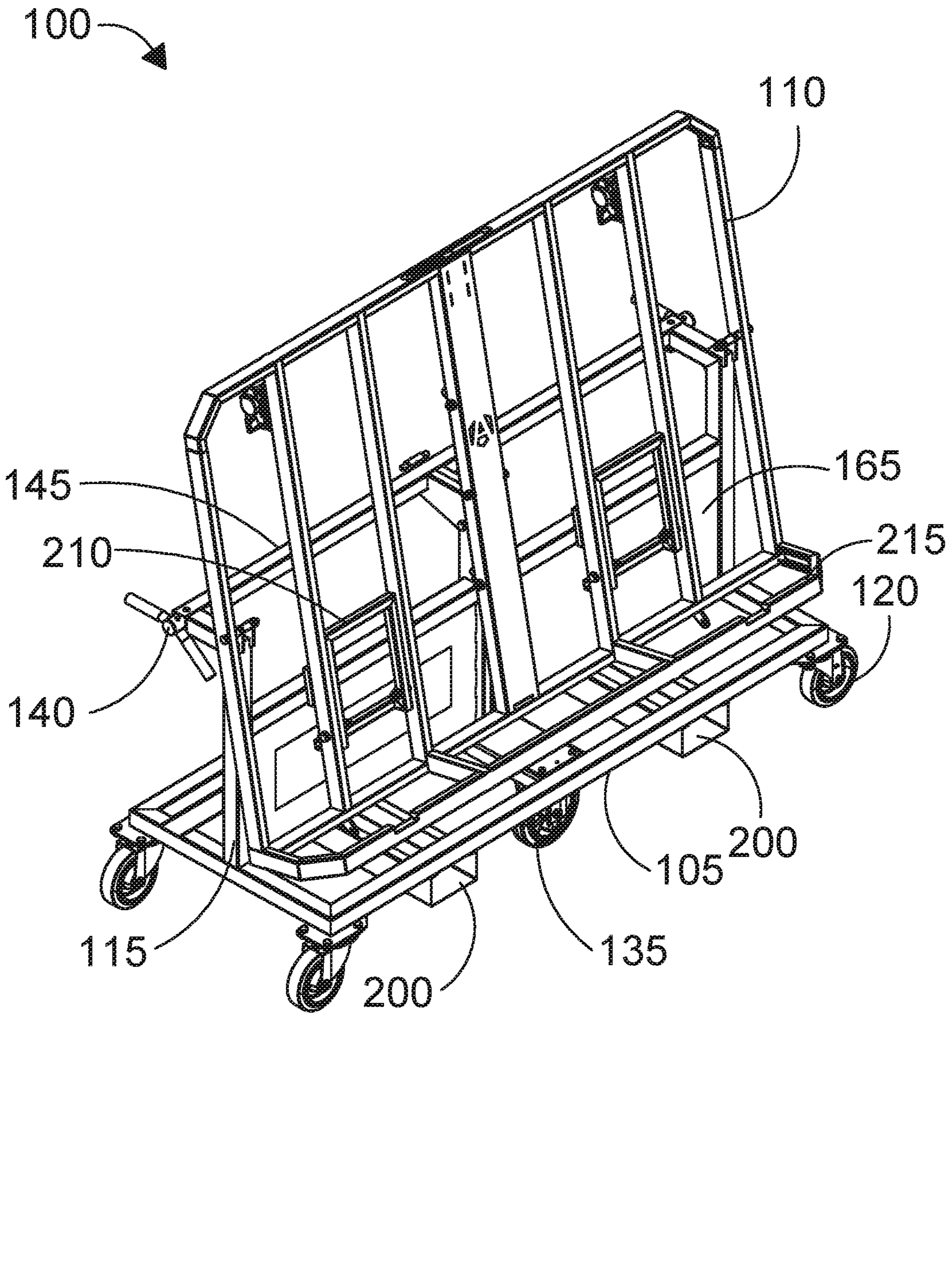
FIG. 1 depicts a perspective view of an embodiment of the trolley apparatus according to the first aspect of the invention, the pivotable member in the second position, in accordance with an aspect of the present invention.

With reference to FIGS. 1-11, an embodiment of a load bearing manual handling trolley apparatus 100 in accordance with the present invention is depicted. The trolley apparatus comprises a frame 115 comprising a base 105. The base 105 comprises a front face, a rear face and two connecting faces arranged so as to form a supportive base with four corners. The frame 115 further comprises an upstanding portion 165 extending along a portion of the frame's 115 longitudinal axis and in a direction away from the base 105. The upstanding portion 165 has a substantially rectangular body and extends in a direction normal to the base 105. The trolley apparatus 100 further comprises a castor wheel 120 located at each corner portion of the base 105.

Figure 2:
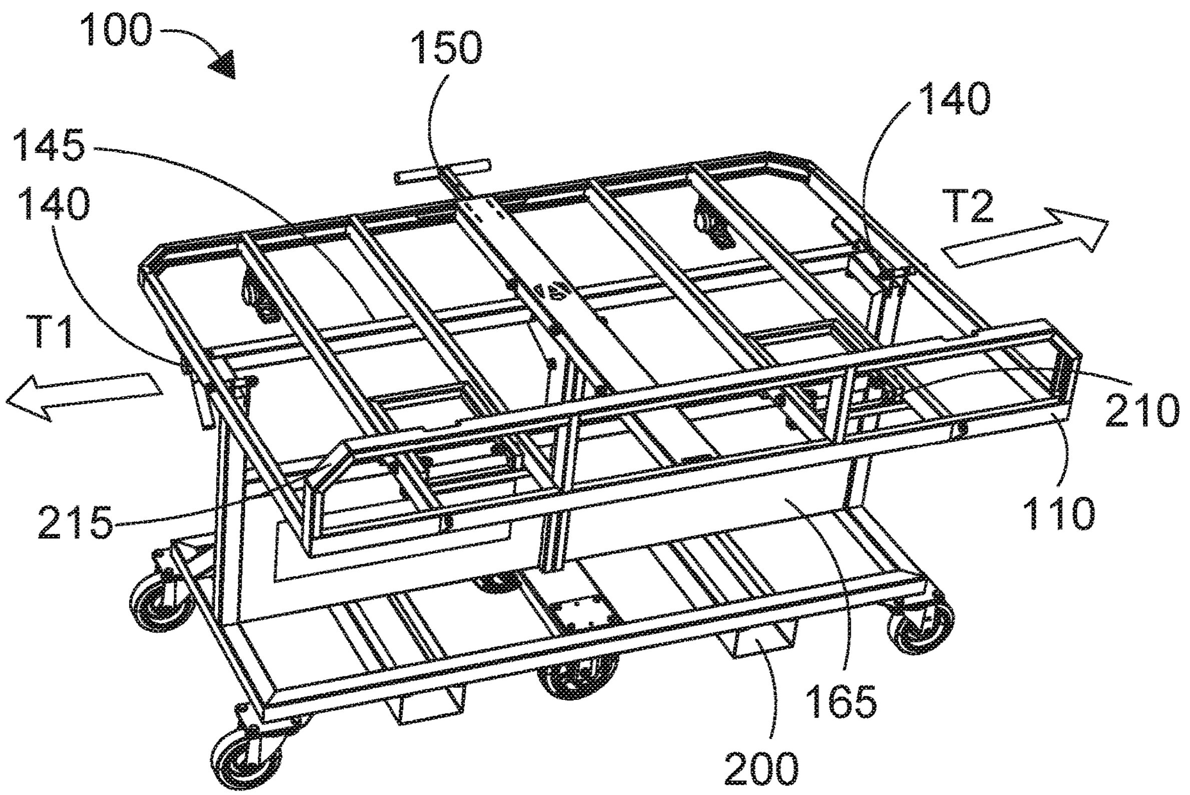
FIG. 2 depicts a perspective view of the trolley apparatus of FIG. 1, the pivotable member in the first position, in accordance with an aspect of the present invention.
Figure 3:
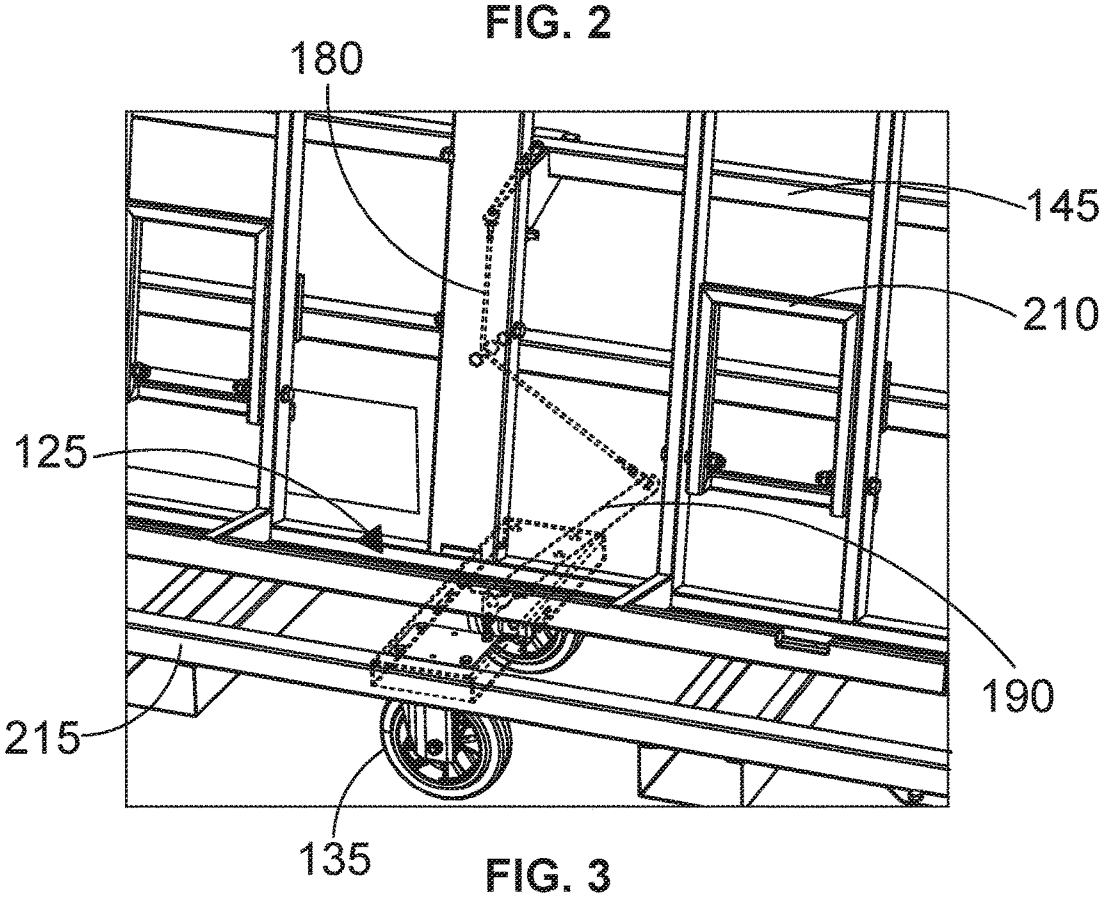
FIG. 3 depicts an enlarged deconstructed view of the brake mechanism of the trolley apparatus of FIG. 1, in accordance with an aspect of the present invention.
Figure 4:
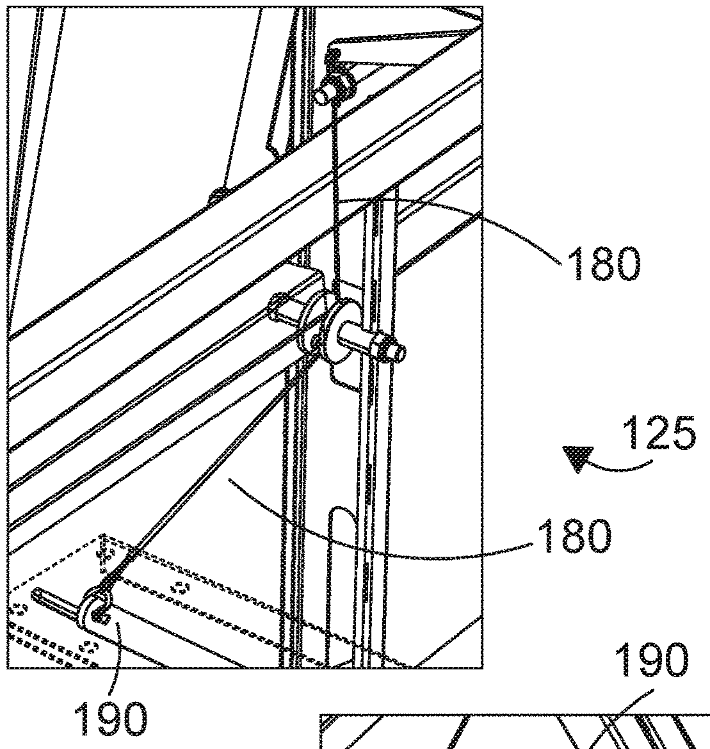
FIG. 4 depicts an enlarged deconstructed view of the cable of the trolley apparatus of FIG. 1, in accordance with an aspect of the present invention.
Figure 5:
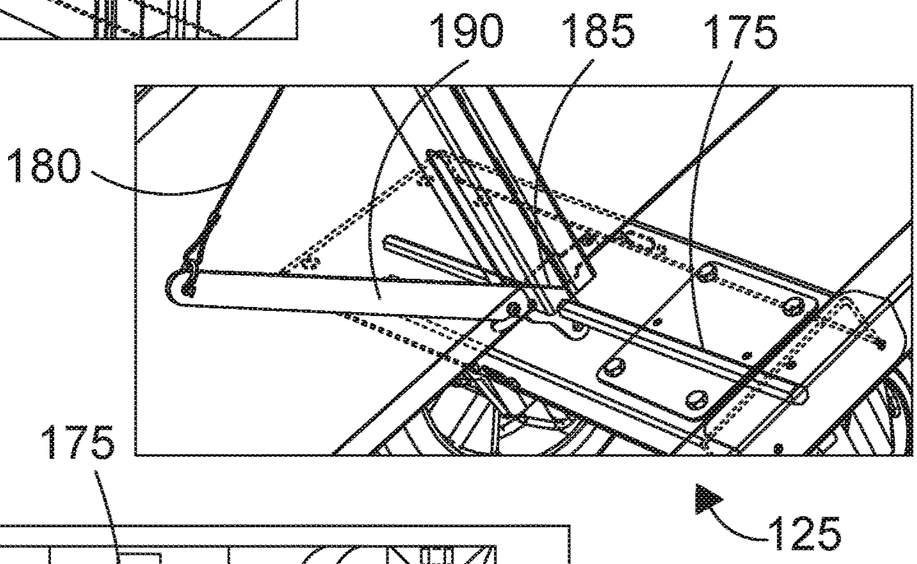
FIG. 5 depicts an enlarged deconstructed view of the arm of the trolley apparatus of FIG. 1, in accordance with an aspect of the present invention.
Figure 6:
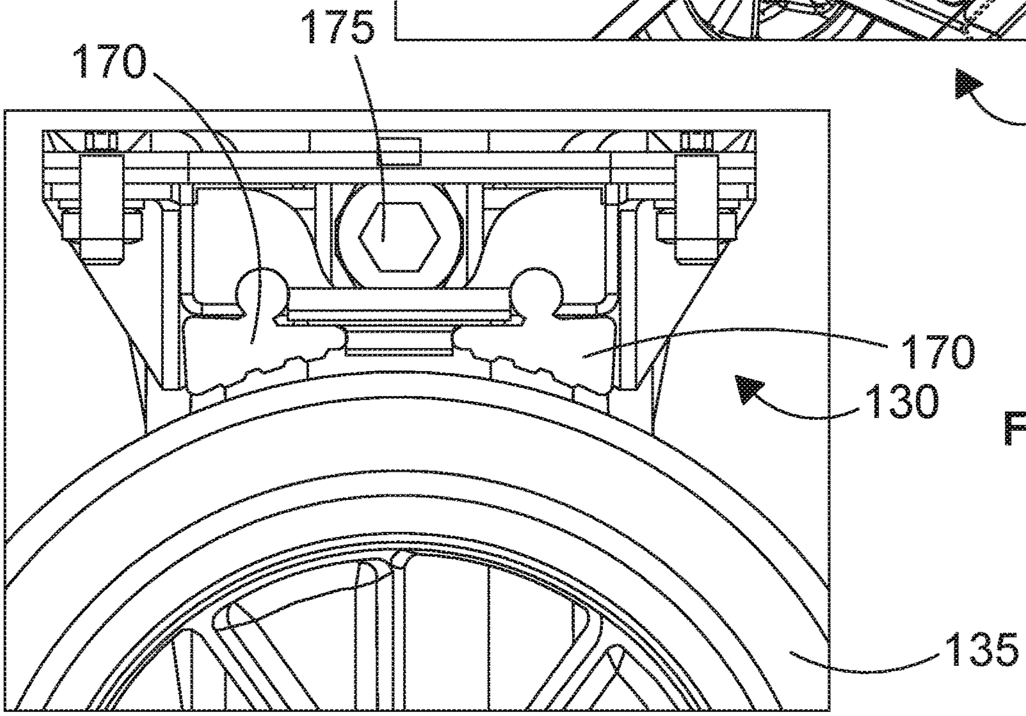
FIG. 6 depicts an enlarged deconstructed view of the wheel unit of the trolley apparatus of FIG. 1, in accordance with an aspect of the present invention.
Figure 7:
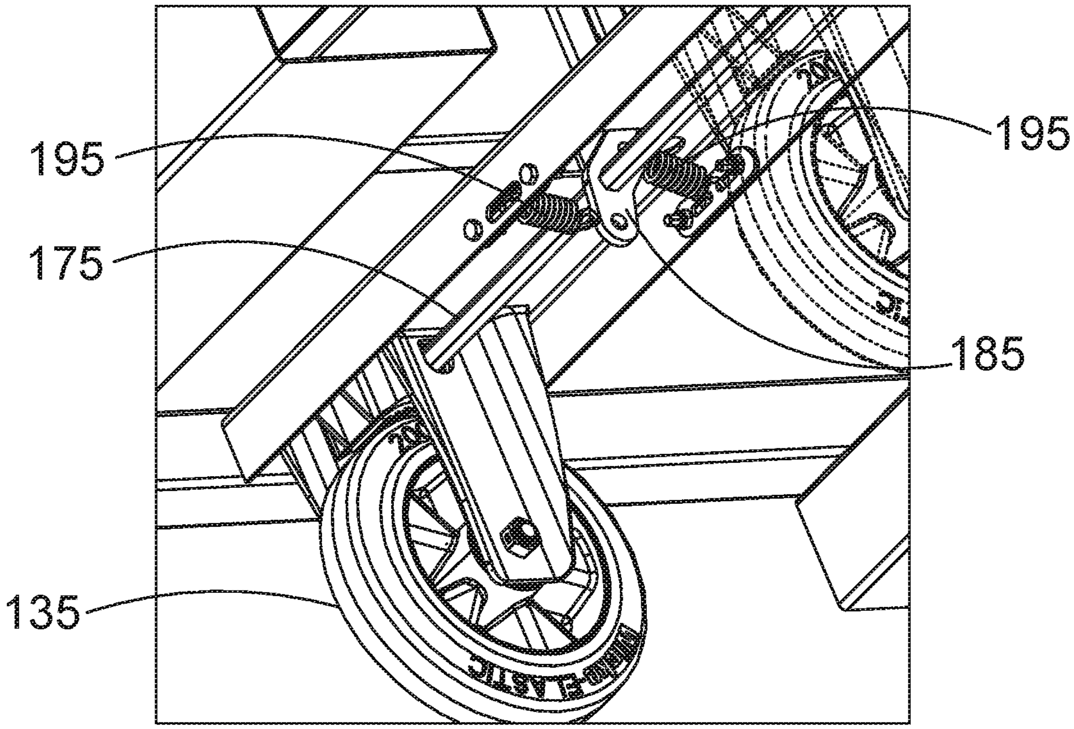
FIG. 7 depicts an enlarged, perspective view of the underside of the trolley apparatus of FIG. 1, in accordance with an aspect of the present invention.
Figure 8:
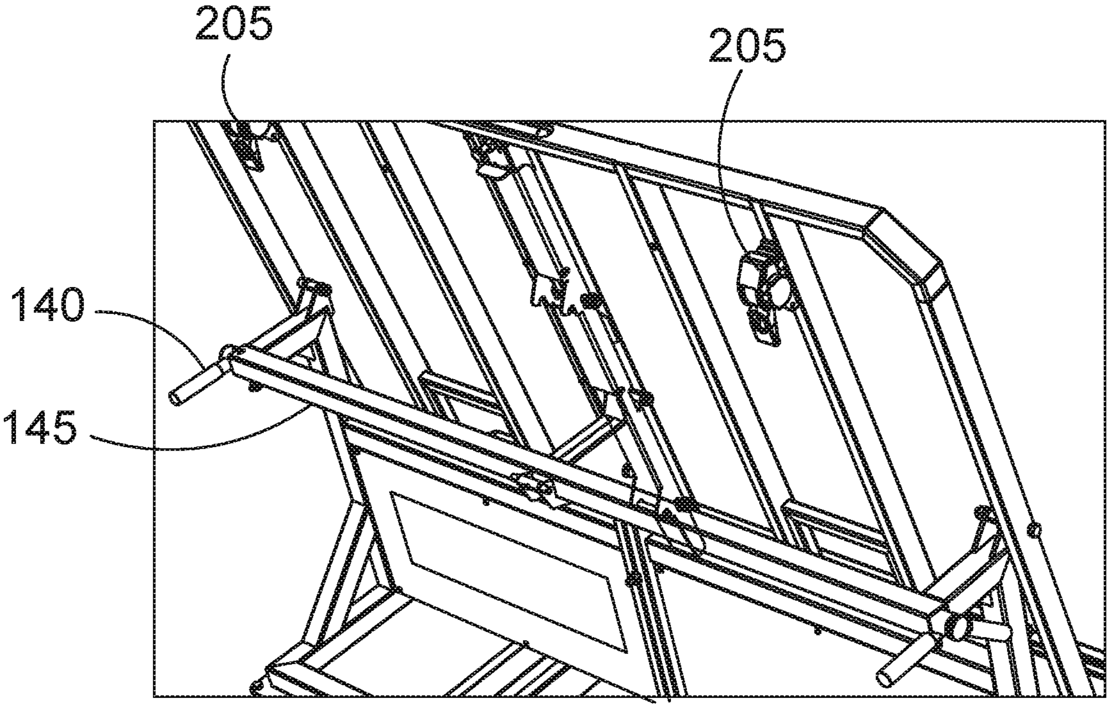
FIG. 8 depicts an enlarged, perspective view of the underside of the pivotable member of the trolley apparatus of FIG. 1, in accordance with an aspect of the present invention.
Figure 9:
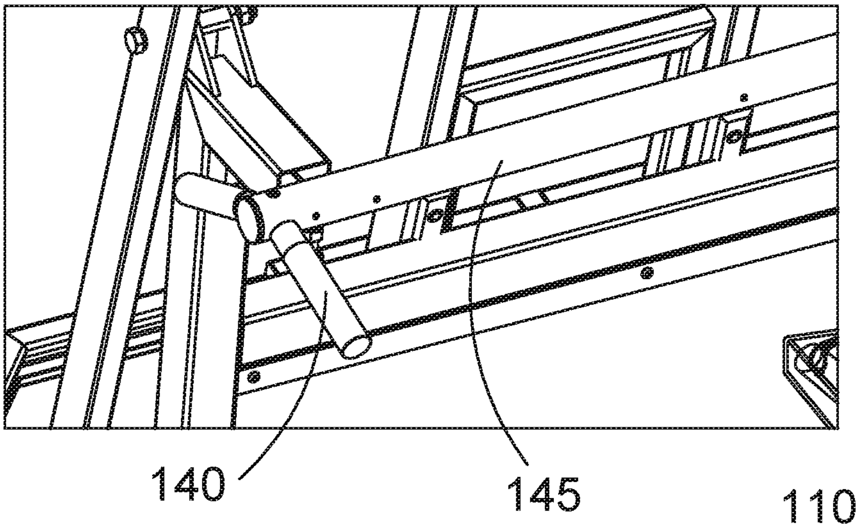
FIG. 9 depicts an enlarged, perspective view of a handle member of the trolley apparatus of FIG. 1, in accordance with an aspect of the present invention.
Figure 10:
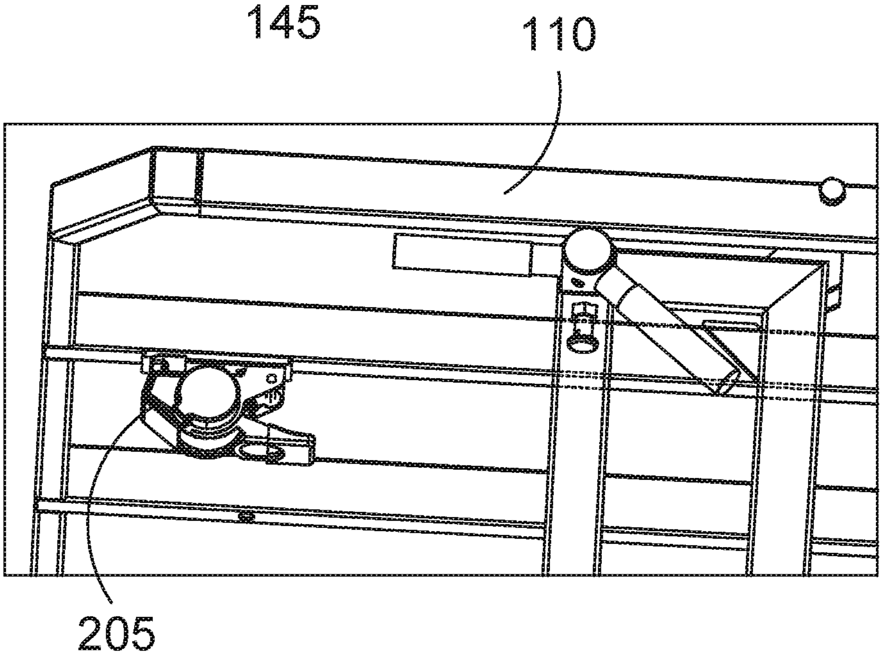
FIG. 10 depicts an enlarged, perspective view of the ratchet straps of trolley apparatus of FIG. 1, in accordance with an aspect of the present invention.

The trolley apparatus 100 further comprises a pivotable member 110 pivotably connected to the frame 115, the pivotable member 110 configured to pivot between a first position (as shown in FIG. 2) and a second position (as shown in FIGS. 1, 3, 8 and 9). In the first position, the pivotable member 110 is substantially parallel to the base and in the second position, the pivotable member 110 is substantially flat against the upstanding portion 165 at an acute angle to the normal axis of the base 105 of the frame 115.

The trolley apparatus further comprises a brake mechanism 125 comprising a wheel unit and a wheel brake apparatus 130 for engaging the wheel unit, the wheel unit comprising at two wheels 135, the two wheels 135 located at opposing sides of the base 105. The wheels 135 are fixed directional castor wheels.

The trolley apparatus 100 comprises two handle members 140 located on the frame 115. Each handle member 140 is telescopic in a direction T1, T2 away from the frame 115, as illustrated in FIG. 2. Each handle member 140 can be independently telescopically extended outwards from the frame 115 and retracted back to the non-telescopic position shown in FIG. 2. The user can load the pivotable member 110 with a load, such as a plurality of panels, and telescopically extend the pivotable member 110 beyond the length of the load on the pivotable member 100 such that the user has easy access to each handle member 140 without interference of the load.

Each handle member 140 is substantially T-shaped to aid rotation of the handle member 140 about its longitudinal axis.

The trolley apparatus 100 comprises an elongate member 145, the elongate member 145 connecting each of the two handle members 140 to the brake mechanism 125, and arranged in operative communication with the wheel brake apparatus 130 and arranged to actuate the wheel brake apparatus 130 such that actuation of any one of the two handle members 140 decouples the brake mechanism 125. The elongate member 145 is arranged to rotate about its longitudinal axis and actuation of the at least one handle member 145 rotates the elongate member 145 about its longitudinal axis. The elongate member 145 is biased to the braked configuration.

A handle member 140 is located at either distal end of the elongate member 145 and both handle members 110 are fixed and rotably coupled to the elongate member 145 such that rotation in wither handle member 140 corresponds to an equal rotation in the elongate member 145. The elongate member 145 extends substantially the entire length of the frame 115. A user can actuate a handle member 140 by twisting the handle member 140 about its longitudinal axis in a first direction to disengage the brake. The user can then remove the force on the handle member 140, or twist the handle member 140 in the opposing direction to engage the brake. The rotational motion of the handle member 140 is independent of the telescopic motion of the handle member 140.

The wheel brake apparatus 130 is located at the perpendicular intersection of the longitudinal axis of the base 105. The wheel brake apparatus 130 comprises four brake pads 170, two brake pads 170 located proximate each wheel 135 of the wheel unit. The brake pads 170 are arranged to engage with the wheels 135 of the wheel unit so as to urge the wheels 135 into a stationary braked position.

The brake mechanism 125 comprises an elongate brake member 175 coupled to each wheel 135 of the wheel unit. The elongate brake member 175 is a bar with hexagonal cross section configured to rotate about its longitudinal axis. The elongate brake member 175 extends between the two wheels 135 in a direction substantially parallel to the base 105. The brake mechanism 125 further comprises an inextensible cable 180 connected to the elongate member 145.

The brake mechanism 135 further comprises a cam 185 with the cable 180 being coupled to the cam 185. The cam 185 is configured to transfer linear motion of the cable 180 to rotational motion via the elongate brake member 175. The cam comprises an arm 190 in communication with the cable 180 and the elongate brake member 175 to increase the moment force of the cable 180 on the elongate brake member 175. The cable 180 is connected to the arm 190 at a first distal end and the cam 185 is connected to the arm 190 at a second distal end.

The brake mechanism 125 comprises two resilient members 195 operably coupled to the cable 180, the resilient members 195 biasing the brake mechanism 125 to a brake position, wherein the brake pads 170 are in contact with the wheels 135 and the motion of the wheels 135 are urged to become stationary. The resilient members 195 are connected to the elongate brake member 175 via the cam 185. Each resilient member 195 is also connected to a fixed portion of the brake mechanism 125. The resilient members 195 are springs.

When a force or tension is applied to the cable 180, the force is transferred to the cam 185 via the arm 190. The cam 185 is rotated about the longitudinal axis of the elongate brake member 175. In this way, a force is applied to each resilient member 195 such that each spring is extended and temporarily deformed. When tension is removed from the cable 180 the resilient members 195 return to their undeformed position, such that the elongate brake member 175 rotates to its braked position. When the resilient members 195 are under no deformation, the wheel brake apparatus is coupled, and the brake is engaged.

As both handle members 140 are independently connected to the brake mechanism 125, actuation of one handle member 140 will result in the same quantity of rotation of the cam 185 and the elongate brake member 175 as actuation of one of the handle members 140. In this way, only the rotation required to decouple the wheel brake apparatus is obtained when both handle members 140 are actuated.

When the wheel brake apparatus is engaged, the brake pads 170 are configured to engage with a portion of the wheels 135. Friction between the brake pads 170 and the surface of the wheels 135 of the wheel unit urges each wheel 135 into a stationary braked position. When the wheels 135 of the wheel unit are stationary, the frictional forces are such that resistance to wheel motion keeps the wheel stationary when subjected to standard forces the trolley apparatus experiences, in use. When the wheel brake apparatus is decoupled, the brake pads 170 are disengaged from the surface of the wheels 135.

In use, the user can actuate one of the handle members 140, and the rotational motion of the handle member 140 will be translated to rotate the elongate member 145. Such motion will increase tension in the cable 180 such that the cable 180 pulls on the arm 110. Motion of the arm 190 rotates the cam 195, which in turn rotates the elongate brake member 175. As the hexagonal bar of the elongate brake member 175 is coupled to an elongated round cam 185, as the elongate brake member 175 rotates, a force towards the wheels 135 will push the brake pads 170 downwards onto the wheels 135.

Figure 11:
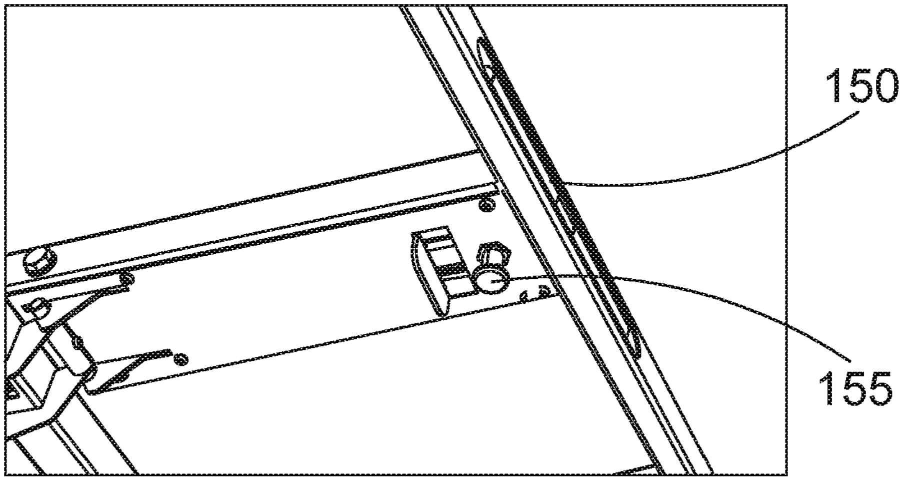
FIG. 11 depicts an enlarged, perspective view of the hand accommodation portion of the trolley apparatus of FIG. 1, in accordance with an aspect of the present invention.

The pivotable member 110 comprises a telescopic hand accommodation portion 150 located centrally along long edge and at the perimeter of the pivotable member 110. The hand accommodation portion 150 comprises a locking member 155 configured to lock the hand accommodation portion 150 in each of the plurality of telescopically extended positions. The hand accommodation portion 150 comprises a non-telescopic position, as shown in FIGS. 1 and 11, wherein substantially no portion of the hand accommodation portion 150 extends beyond the perimeter of the pivotable member 110.

The pivotable member 110 comprises a counterbalance unit configured to prevent rotation of the pivotable member 110 unless a force is applied to the hand accommodation portion 150.

Figure 12:
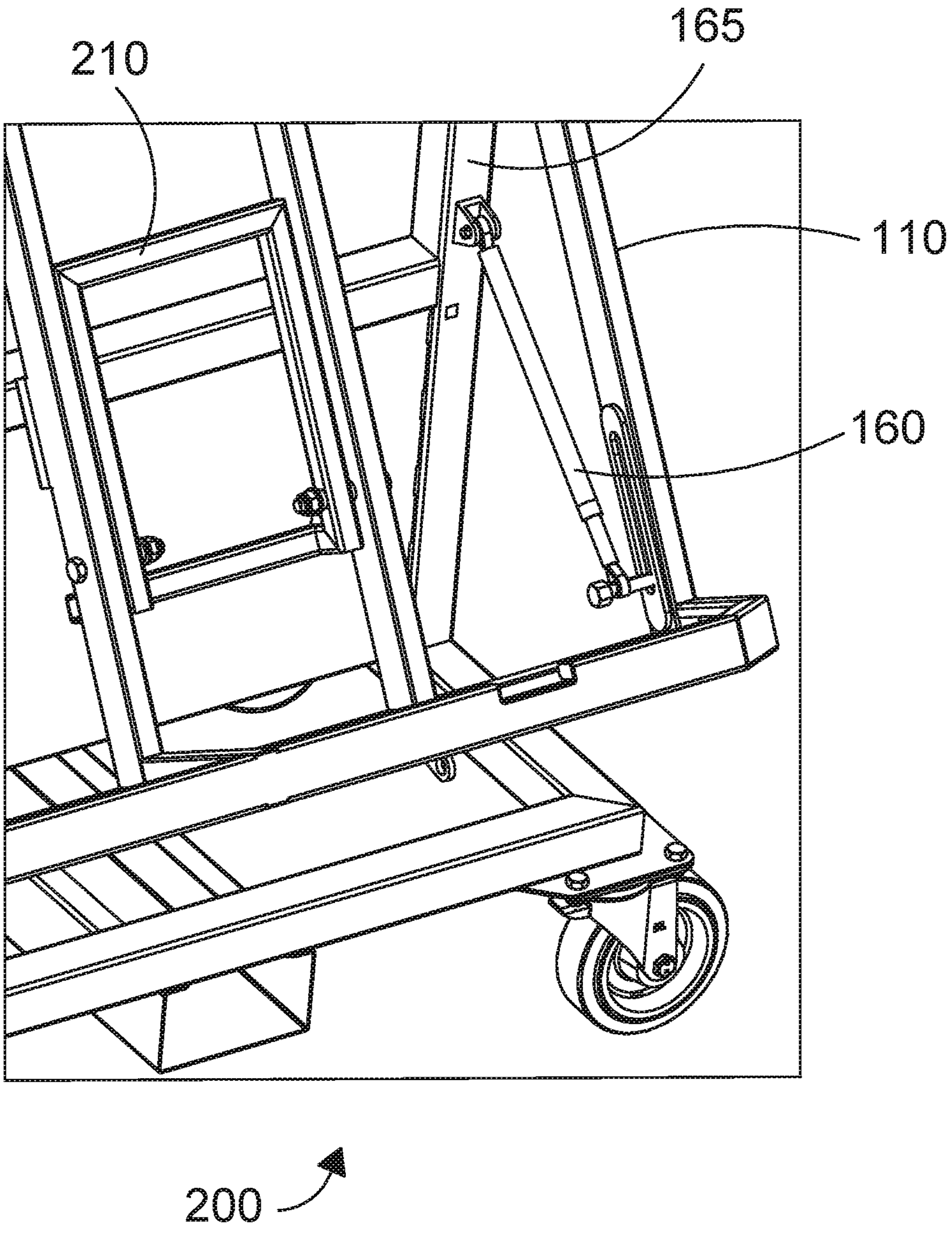
FIG. 12 depicts enlarged, perspective view of a pneumatic member of a second embodiment of the trolley apparatus of FIG. 1, in accordance with an aspect of the present invention.

FIG. 12 depicts a second embodiment of the trolley apparatus 100 of FIGS. 1-11. The trolley apparatus 200 of FIG. 12 is substantially identical to the trolley apparatus 100 of FIGS. 1-11 except that the trolley apparatus 200 of FIG. 12 comprises a pair of pneumatic members 160. The counterbalance unit comprises two pneumatic members 160, each pneumatic member 160 comprising a gas strut. The pneumatic members 160 are located at opposing distal ends of the pivotable member 110. Each pneumatic member 160 is connected at a first end to the upstanding portion 165 and at a second end to the underside of the pivotable member 110. The feature of the pair of pneumatic members 160 may be directly applied to the trolley apparatus 100 of FIGS. 1-11.

Each pneumatic member 160 comprises an adjustable member 220 configured to adjust the location of the connection of the second end of the pneumatic member 160 to the pivotable member 110. The adjustable member 220 comprises a linear pathway 230 along which the second end of the pneumatic member 160 is configured to traverse. The linear pathway 230 is parallel to an edge of the pivotable member 110. The first end of each pneumatic member 160, namely the end of the pneumatic member 160 attached to the upstanding portion 165, is pivotably connected to the upstanding portion 165 to facilitate motion of the second end in the adjustable member 220.

The counterbalance unit comprises a locking unit configured to lock the pivotable member 110 in the first position and the second position. The counterbalance unit prevents unwanted pivoting of the pivotable member 110 in both directions about its longitudinal axis.

The pivotable member 110 is connected to the upstanding portion 165 of the frame 115 along the central longitudinal axis of the pivotable member 110. The width of the pivotable member 110 is such that a portion of the pivotable member 110 contacts the base 105 when the pivotable member 110 is in the second position. The pivoting motion of the pivotable member 110 is independent of the brake mechanism 125, such that the brake mechanism 135 can be actuated regardless of the position of the pivotable member 110.

The base 105 comprises a carrying member 200 configured to allow the trolley apparatus 100 to be carried by a forklift truck. The carrying member 200 comprises two hollow beams configured to house each respective fork of a standard forklift truck. In this way, the forks of a forklift truck can be inserted into the forklift carrying member to allow the forklift truck to carry and transport the trolley apparatus 10. The two beams of the forklift carrying member 200 extend the width of the base 105. The carrying member 200 is located on the underside of the frame 105.

The trolley apparatus 100 further comprises a load retention portion comprising two ratchet straps 205 configured to retain at least a portion of a load located on the pivotable member 110. The ratchet straps 205 are located on the equidistant on the length of, and on the underside of, the pivotable member 110 and are configured to extend about at least two faces of the pivotable member 110.

The trolley apparatus 100 comprises a load structure 215 extending the perimeter of the pivotable member 110. The load structure 215 extends perpendicular to the pivotable member 110 and is configured to support a load located on the pivotable member 110, in particular when the pivotable member 110 is in the second position.

The trolley apparatus 100 further comprises a load support member 210 located on the pivotable member 110 and configured in a first position to sit flush against the pivotable member 110. In a second position, the load support member 210 is configured to be pivoted to a position substantially perpendicular to the pivotable member 110. The load support member 210 provides a support surface to support a load located on the pivotable member 110, in use. The load support member 210 comprises two rectangular frames located equidistant on the pivotable member 110. The rectangular frames are configured to rotate towards the load structure 215 to support a load located on the pivotable member 110, in particular when the pivotable member 110 is in the second position. The load support structure 210 further supports loads located on the pivotable member 110 from moving while the trolley apparatus 100 is in transit.

The present invention is particularly advantageous as a large number of goods, such as stacks of plasterboards, can be transported safely with a means of firstly securing the goods onto the trolley apparatus and then pivoting the pivotable member to fit the apparatus and goods through restrictive areas such as corridors or doorways. Further, the deadman brake improves safety if a user loses control the trolley apparatus. The telescopic handle members allow the user to actuate the brake mechanism from an area of reduced danger non-dangerous area during the maneuvering of the trolley apparatus. The trolley apparatus acts as a workbench to action the goods, such as cutting or scoring boards loaded on the trolley apparatus.

As may be recognized by those of ordinary skill in the art based on the teachings herein, numerous changes and modifications may be made to the above-described and other embodiments of the present disclosure without departing from the scope of the disclosure. The components of the trolley apparatus as disclosed in the specification, including the accompanying abstract and drawings, may be replaced by alternative component(s) or feature(s), such as those disclosed in another embodiment, which serve the same, equivalent or similar purpose as known by those skilled in the art to achieve the same, equivalent or similar results by such alternative component(s) or feature(s) to provide a similar function for the intended purpose. In addition, the trolley apparatus may include more or fewer components or features than the embodiments as described and illustrated herein. For example, the components and features of FIGS. 1-12 may be used interchangeably and in alternative combinations as would be modified or altered by one of skill in the art. Accordingly, this detailed description of the currently-preferred embodiments is to be taken in an illustrative, as opposed to limiting the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The invention has been described with reference to the preferred embodiments. It will be understood that the operational embodiments described herein are exemplary of a plurality of possible arrangements to provide the same general features, characteristics, and general system operation. Modifications and alterations will occur to others upon a reading and understanding of the preceding detailed description. It is intended that the invention be construed as including all such modifications and alterations.

Having thus described the preferred embodiment, the invention is now claimed to be:

1. A load bearing manual handling trolley apparatus, said trolley apparatus comprising:

a frame comprising a base, said base comprising a front face, a rear face and two connecting faces arranged so as to form a supportive base with four corners;

said trolley apparatus further comprising a pivotable member pivotably connected to said frame, said pivotable member configured to pivot between a first position and a second position;

at least one wheel located at each corner portion of said base;

a brake mechanism comprising a wheel unit and a wheel brake apparatus for engaging said wheel unit, said wheel unit comprising at least one wheel;

at least one handle member located on said frame;

wherein a portion of said at least one handle member projects beyond the length of said pivotal member; and wherein said at least one handle member is telescopic in a direction away from said frame;

an elongate member, said elongate member connecting each of said at least one handle members to said brake mechanism, and arranged in operative communication with the wheel brake apparatus and arranged to actuate the wheel brake apparatus such that actuation of any one of said at least one handle members decouples said brake mechanism;

wherein said elongate member is arranged to rotate about its longitudinal axis and actuation of the at least one handle member rotates the elongate member about its longitudinal axis; and wherein said elongate member is biased to the braked configuration.

2. The load bearing manual handling apparatus of claim 1, wherein said at least one handle member is located at an end of said elongate member.

3. The load bearing manual handling trolley apparatus of claim 1, wherein said pivotable member comprises at least one hand accommodation portion.

4. The load bearing manual handling trolley apparatus of claim 3, wherein said pivotable member comprises a counterbalance unit configured to prevent rotation of the pivotable member unless a force is applied to the at least one hand accommodation portion.

5. The load bearing manual handling trolley apparatus of claim 4, wherein the counterbalance unit comprises at least one pneumatic member, the pneumatic member connecting said frame to said pivotable member.

6. The load bearing manual handling trolley apparatus of claim 4, wherein said counterbalance unit comprises two pneumatic members located at opposing distal ends of said frame.

7. The load bearing manual handling trolley apparatus of claim 1, wherein said pivotable member is connected to said frame along the longitudinal axis of said frame.

8. The load bearing manual handling trolley apparatus of claim 7, wherein said frame comprises an upstanding portion extending along a portion of its longitudinal axis and in a direction away from said base, said pivotable member connected to said upstanding portion.

9. The load bearing manual handling trolley apparatus of claim 1, wherein in the first position, said pivotable member is substantially parallel to the base.

10. The load bearing manual handling trolley apparatus of claim 1, wherein in the second position, said pivotable member is substantially flat against said frame.

11. The load bearing manual handling trolley apparatus of claim 1, wherein said brake mechanism comprises a cable connected to said elongate member.

12. The load bearing manual handling trolley apparatus of claim 11, wherein said brake mechanism comprises an elongate brake member coupled to each wheel of said wheel unit and wherein said elongate brake member is configured to rotate about its longitudinal axis.

13. The load bearing manual handling trolley apparatus of claim 12, wherein said brake mechanism further comprises at least one cam configured to transfer linear motion of said cable to rotational motion via said elongate brake member.

14. The load bearing manual handling trolley apparatus of claim 13, wherein said at least one cam comprises an arm in communication with said cable and said elongate brake member.

15. The load bearing manual handling trolley apparatus of claim 1, wherein the wheel brake apparatus comprises a friction brake.

16. The load bearing manual handling trolley apparatus of claim 1, wherein said elongate member extends along substantially the entire length of said frame.

17. The load bearing manual handling trolley apparatus of claim 1, wherein said trolley apparatus comprises at least one load retention portion configured to retain at least a portion of a load on said trolley apparatus.

18. The load bearing manual handling trolley apparatus of claim 17, wherein the at least one load retention portion comprises a retaining member and a retaining member acceptance portion.

19. The load bearing manual handling apparatus of claim 1, wherein said trolley apparatus further comprises a forklift carrying member configured to allow said trolley apparatus to be carried by a forklift truck.

* * * * *